United States Patent
Ye et al.

(10) Patent No.: US 11,870,332 B2
(45) Date of Patent: Jan. 9, 2024

(54) POWER CONVERSION CIRCUIT WITH TRANSFORMER

(71) Applicant: Delta Electronics, Inc., Taoyuan (TW)

(72) Inventors: Zhengyu Ye, Taoyuan (TW); Xueliang Chang, Taoyuan (TW); Shengli Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 148 days.

(21) Appl. No.: 17/540,006

(22) Filed: Dec. 1, 2021

(65) Prior Publication Data
US 2022/0209671 A1 Jun. 30, 2022

(30) Foreign Application Priority Data
Dec. 31, 2020 (CN) .......................... 202011630353.1

(51) Int. Cl.
*H02M 1/00* (2006.01)

(52) U.S. Cl.
CPC ........ *H02M 1/0095* (2021.05); *H02M 1/0064* (2021.05)

(58) Field of Classification Search
CPC .............. H02M 3/158; H02M 3/1584; H02M 3/33569; H02M 1/0064; H02M 1/0083; H02M 1/0095; H02M 3/07; H02M 3/01
See application file for complete search history.

(56) References Cited

U.S. PATENT DOCUMENTS

| | | | |
|---|---|---|---|
| 10,199,950 B1 | 2/2019 | Vinciarelli et al. | |
| 10,224,803 B1* | 3/2019 | Rainer | H02M 3/335 |
| 10,256,729 B1* | 4/2019 | Notsch | H02M 3/1588 |
| 10,804,798 B1 | 10/2020 | Rizzolatti et al. | |
| 10,862,339 B2* | 12/2020 | Hosotani | H02J 7/00034 |
| 11,637,491 B2* | 4/2023 | Petersen | H02M 3/07 323/271 |

(Continued)

OTHER PUBLICATIONS

D. Huang, X. Wu and F. C. Lee, "Novel non-isolated LLC resonant converters," 2012 Twenty-Seventh Annual IEEE Applied Power Electronics Conference and Exposition (APEC), 2012, pp. 1373-1380.

*Primary Examiner* — Gustavo A Rosario-Benitez
(74) *Attorney, Agent, or Firm* — KIRTON McCONKIE; Evan R. Witt (57) ABSTRACT

The present disclosure provides a power conversion circuit including input positive and negative terminals, output positive and negative terminals, an input inductor, two bridge arms, a transformer, an output capacitor and an auxiliary capacitor. The input and output negative terminals are connected. A first terminal of the input inductor is coupled to the input positive terminal. Each bridge arm includes three switches connected in series and two connection points between the switches. The winding of the transformer is coupled in series between the connection points of the two bridge arms, and two windings of the transformer are connected and form a connection point coupled to the output positive terminal. Two terminals of the output capacitor are electrically connected to the output positive and negative terminals respectively. Two terminals of the auxiliary capacitor are electrically connected to a second terminal of the input inductor and the output terminal respectively.

17 Claims, 13 Drawing Sheets

(56) References Cited

U.S. PATENT DOCUMENTS

| | | | |
|---|---|---|---|
| 2007/0164685 A1* | 7/2007 | Hase | H05B 41/2881 |
| | | | 315/274 |
| 2009/0201620 A1* | 8/2009 | Gray | H02P 25/0925 |
| | | | 361/159 |
| 2014/0346962 A1* | 11/2014 | Sanders | H05B 45/3725 |
| | | | 315/193 |
| 2016/0261195 A1* | 9/2016 | Yamaoka | H02M 3/33592 |
| 2019/0089286 A1* | 3/2019 | Toba | H03K 4/48 |
| 2021/0083575 A1* | 3/2021 | Jin | H02M 1/08 |
| 2021/0288576 A1* | 9/2021 | Rizzolatti | H02M 3/158 |

\* cited by examiner

POWER CONVERSION CIRCUIT WITH TRANSFORMER

CROSS-REFERENCE TO RELATED APPLICATION

This application claims priority to China Patent Application No. 202011630353.1, filed on Dec. 31, 2020, the entire contents of which are incorporated herein by reference for all purposes.

FIELD OF THE INVENTION

The present disclosure relates to a power conversion circuit, and more particularly to a power conversion circuit with a variable gain ratio of input to output voltage.

BACKGROUND OF THE INVENTION

Figure 1:
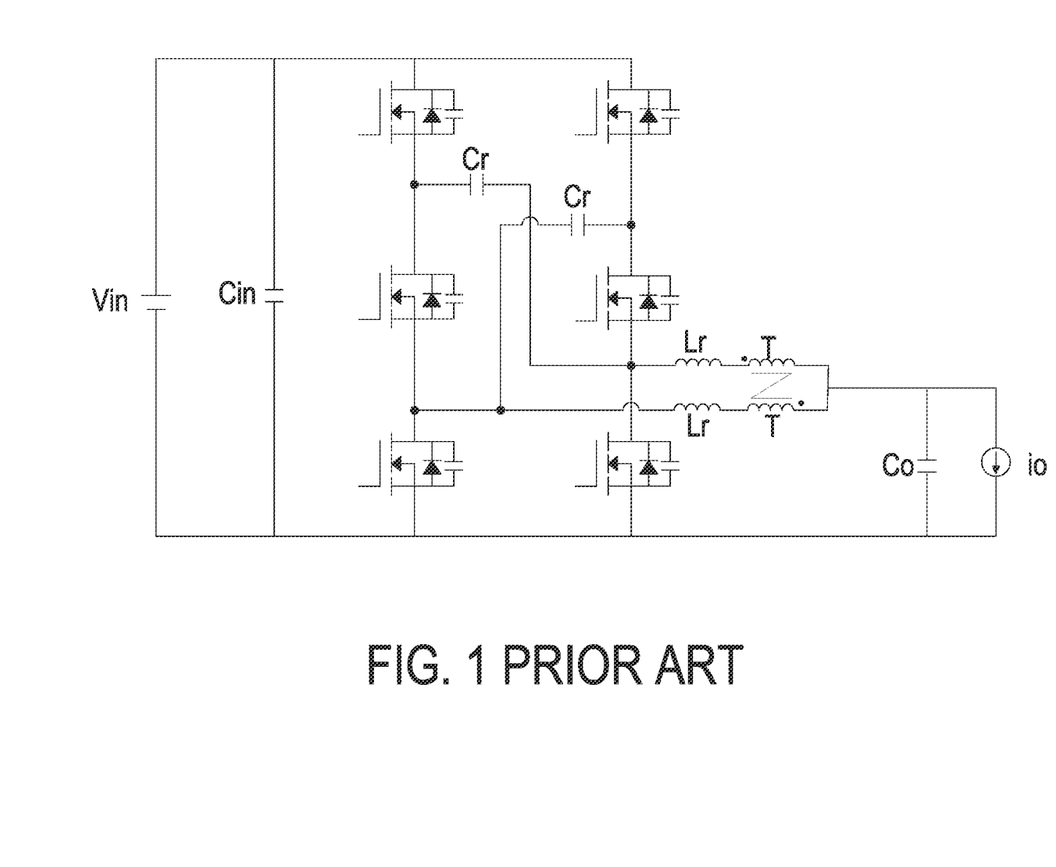
FIG. 1 is schematic circuit diagram illustrating a conventional buck circuit with an extensible duty ratio.

With the rapid development of fixed network and mobile communications, the demand for high-power DC/DC power converters (especially proportional converters) is increasing. FIG. 1 shows a conventional buck circuit with an extensible duty ratio. The buck circuit has a gain ratio of input to output voltage of 4:1, and has the advantage of high power density. However, in this buck circuit, since the voltage at the connection point between the switches cannot be varied by adjusting the capacitance of the capacitor, the gain ratio of input to output voltage cannot be changed. Thus, the buck circuit can only work in the applications with the gain ratio of input to output voltage of 4:1, which makes the applicability of the buck circuit poor.

Therefore, there is a need of providing a power conversion circuit in order to overcome the drawbacks of the conventional technologies.

SUMMARY OF THE INVENTION

The present disclosure provides a power conversion circuit with a variable gain ratio of input to output voltage. The gain ratio of input to output voltage may be varied through adjusting the turns ratio of the windings of the transformer. Accordingly, the power conversion circuit can be applied in applications with various requirements for gain ratio of input to output voltage, which makes the applicability of the power conversion circuit great.

In accordance with an aspect of the present disclosure, a power conversion circuit is provided. The power conversion circuit includes an input positive terminal, an input negative terminal, an output positive terminal, an output negative terminal, an input inductor, a first bridge arm, a second bridge arm, a transformer, an output capacitor and an auxiliary capacitor. The input negative terminal and the output negative terminal are connected to each other. A first terminal of the input inductor is coupled to the input positive terminal. The first bridge arm includes a first switch, a second switch and a third switch coupled in series. The first and third switches are electrically connected to a second terminal of the input inductor and the input negative terminal respectively. The first and second switches are connected and form a first connection point, and the second and third switches are connected and form a second connection point. The second bridge arm includes a fourth switch, a fifth switch and a sixth switch coupled in series. The fourth and sixth switches are electrically connected to the second terminal of the input inductor and the input negative terminal respectively. The fourth and fifth switches are connected and form a third connection point, and the fifth and sixth switches are connected and form a fourth connection point. The transformer includes a first winding, a second winding and a third winding. The first winding is coupled between the first and third connection points, and the second and third windings are coupled between the second and fourth connection points. The second and third windings are connected and form a fifth connection point, and the fifth connection point is connected to the output positive terminal. The output capacitor is connected between the output positive terminal and the output negative terminal. A first terminal of the auxiliary capacitor is electrically connected to the second terminal of the input inductor, and a second terminal of the auxiliary capacitor is electrically connected to the output positive terminal or the output negative terminal.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2A:
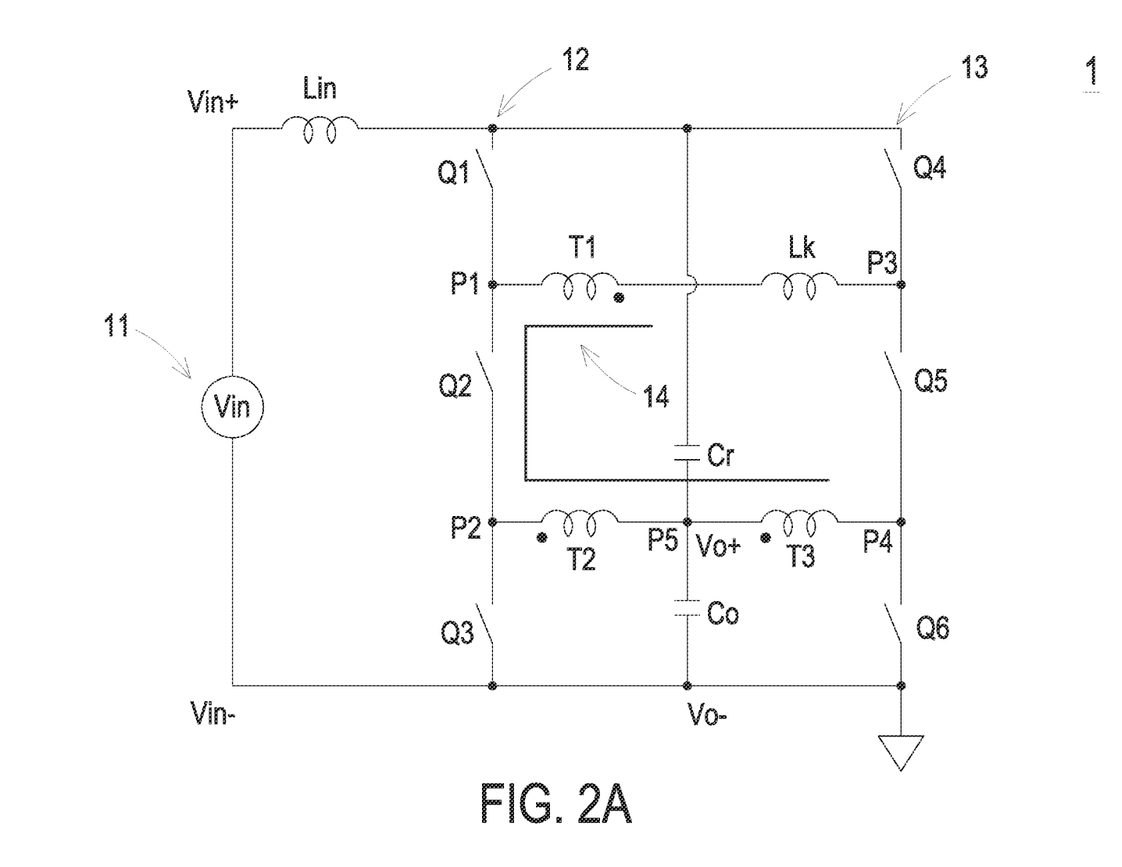
FIG. 2A is a schematic circuit diagram illustrating a power conversion circuit according to an embodiment of the present disclosure.

FIG. 2A is a schematic circuit diagram illustrating a power conversion circuit according to an embodiment of the present disclosure. As shown in FIG. 2A, the power conversion circuit 1 is connected to a DC voltage source 11 and a load (not shown). The power conversion circuit 1 is configured to convert the voltage from the DC voltage source 11 and supply power to the load. The DC voltage source 11 provides an input voltage Vin, and is electrically connected to an input positive terminal Vin+ and an input negative terminal Vin− of the power conversion circuit 1.

The load is electrically connected to an output positive terminal Vo+ and an output negative terminal Vo− of the power conversion circuit 1. The input negative terminal Vin− and the output negative terminal Vo− are connected to each other. The voltage between the output positive terminal Vo+ and the output negative terminal Vo− is an output voltage Vo. The power conversion circuit 1 includes an input inductor Lin, a first bridge arm 12, a second bridge arm 13, a transformer 14, a series inductor Lk, an output capacitor Co and an auxiliary capacitor Cr. A first terminal of the input inductor Lin is coupled to the input positive terminal Vin+. In addition, the inductance of the input inductor Lin is much larger than the inductance of the series inductor Lk so that the current flowing through the input inductor Lin is constant. Therefore, the DC voltage source 11 and the input inductor Lin can be equivalent as an input current source.

The first bridge arm 12 includes a first switch Q1, a second switch Q2 and a third switch Q3 coupled in series. The first switch Q1 and the third switch Q3 are electrically connected to a second terminal of the input inductor Lin and the input negative terminal Vin− respectively. The first switch Q1 and the second switch Q2 are connected in series and form a first connection point P1, and the second switch Q2 and the third switch Q3 are connected in series and form a second connection point P2. The second bridge arm 13 includes a fourth switch Q4, a fifth switch Q5 and a sixth switch Q6 coupled in series. The fourth switch Q4 and the sixth switch Q6 are electrically connected to the second terminal of the input inductor Lin and the input negative terminal Vin− respectively. The fourth switch Q4 and the fifth switch Q5 are connected in series and form a third connection point P3, and the fifth switch Q5 and the sixth switch Q6 are connected in series and form a fourth connection point P4. The switches in the first bridge arm 12 and the second bridge arm 13 are for example but not limited to MOSFETs, SiC switches or GaN switches.

The transformer 14 includes a first winding T1, a second winding T2 and a third winding T3 coupled to each other. The number of turns of the first winding T1 is N1, and the number of turns of the second winding T2 and the third winding T3 are both N2. The first winding T1 and the series inductor Lk are coupled in series between the first connection point P1 and the third connection point P3. The second winding T2 and the third winding T3 are coupled in series between the second connection point P2 and the fourth connection point P4. There is a fifth connection point P5 between the second winding T2 and the third winding T3, and the fifth connection point P5 is connected to the output positive terminal Vo+. In an embodiment, the series inductor Lk may be a leakage inductance of the transformer 14 or an additional inductor, but not limited thereto. In another embodiment, the series inductor Lk may be an equivalent inductance of the sum of the leakage inductance of the transformer 14 and an additional inductor.

The output capacitor Co is connected between the output positive terminal Vo+ and the output negative terminal Vo−. Two terminals of the auxiliary capacitor Cr are electrically connected to the second terminal of the input inductor Lin and the output positive terminal Vo+ respectively. A voltage VCr across the auxiliary capacitor Cr equals the sum of a DC voltage component and an oscillating AC voltage component, where the DC voltage component equals the difference between the input voltage Vin and the output voltage Vo. Preferably but not exclusively, the capacitance of the output capacitor Co is larger than the capacitance of the auxiliary capacitor Cr.

Figure 2B:
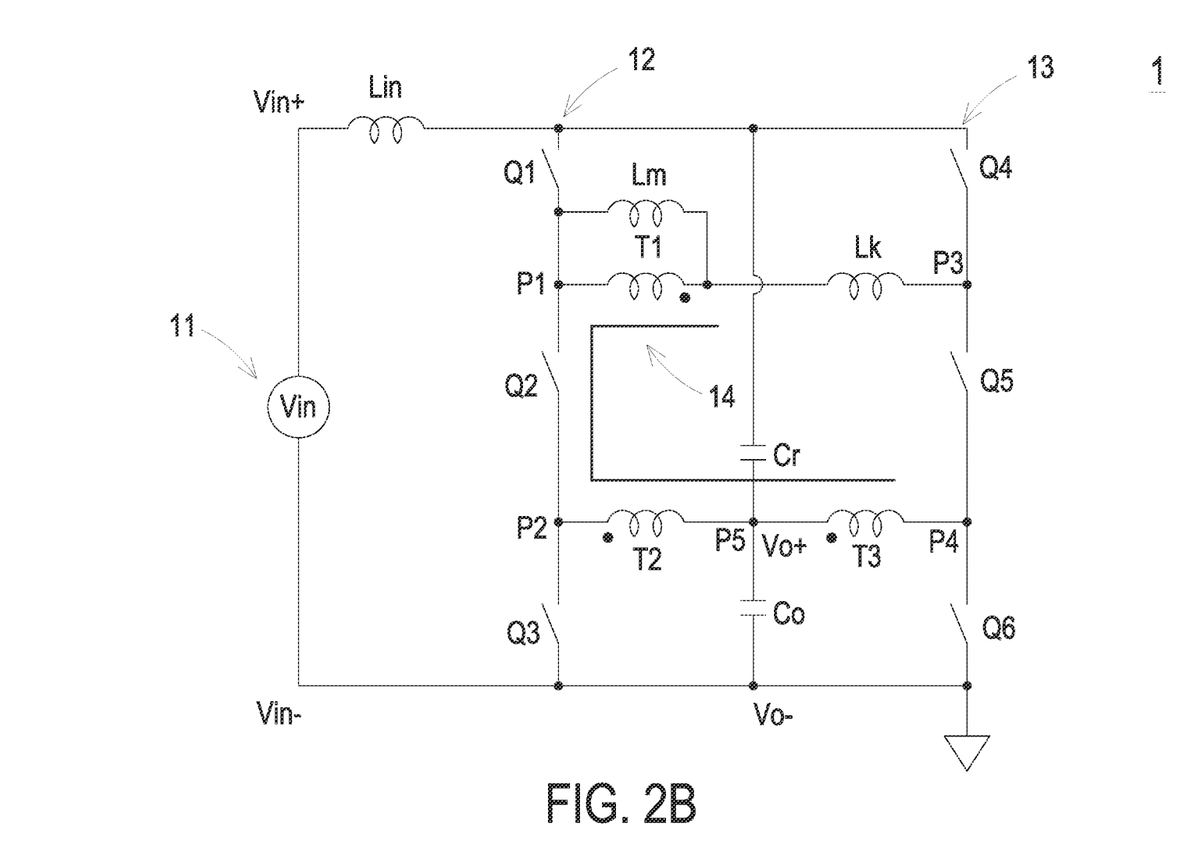
FIG. 2B schematically shows the magnetizing inductance of the transformer of the power conversion circuit of FIG. 2A.

FIG. 2B schematically shows the magnetizing inductance of the transformer of the power conversion circuit of FIG. 2A. As shown in FIG. 2B, the magnetizing inductance Lm of the transformer 14 can be equivalent as being connected to the first winding T1 in parallel, but not limited thereto. In another embodiment, the magnetizing inductance Lm can be equivalent as being connected to the second winding T2 or the third winding T3 in parallel.

Figure 3:
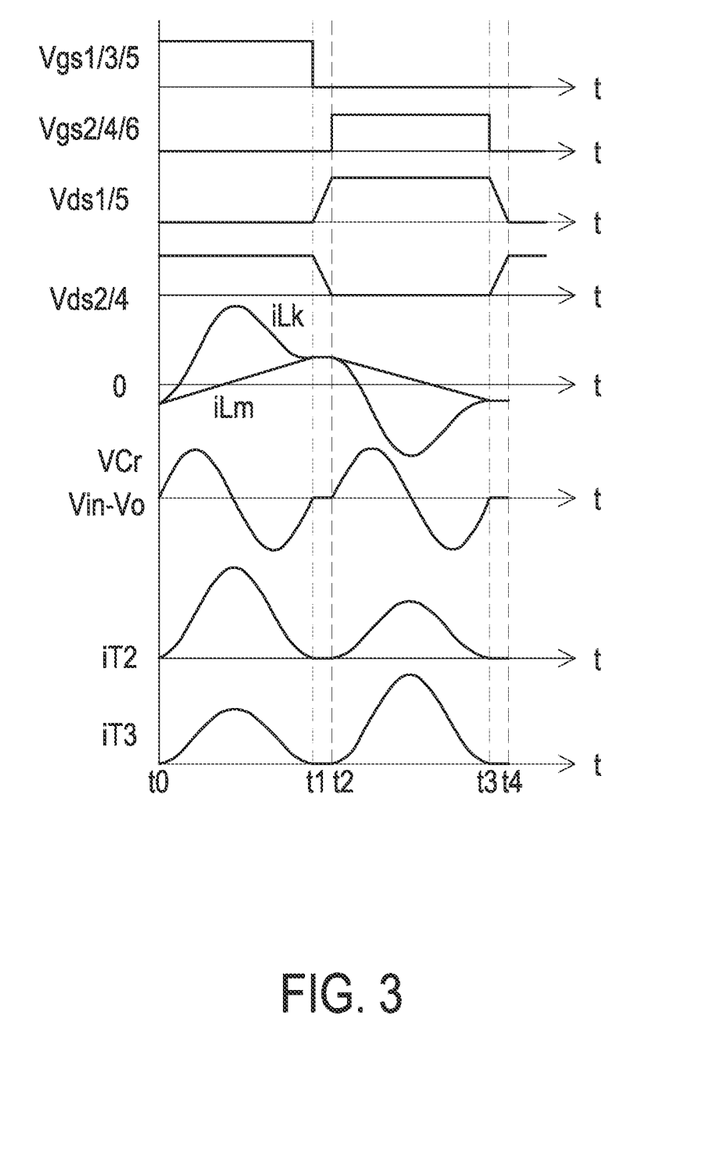
FIG. 3 is a schematic oscillogram illustrating the key waveforms of the power conversion circuit of FIG. 2A.
Figure 4A:
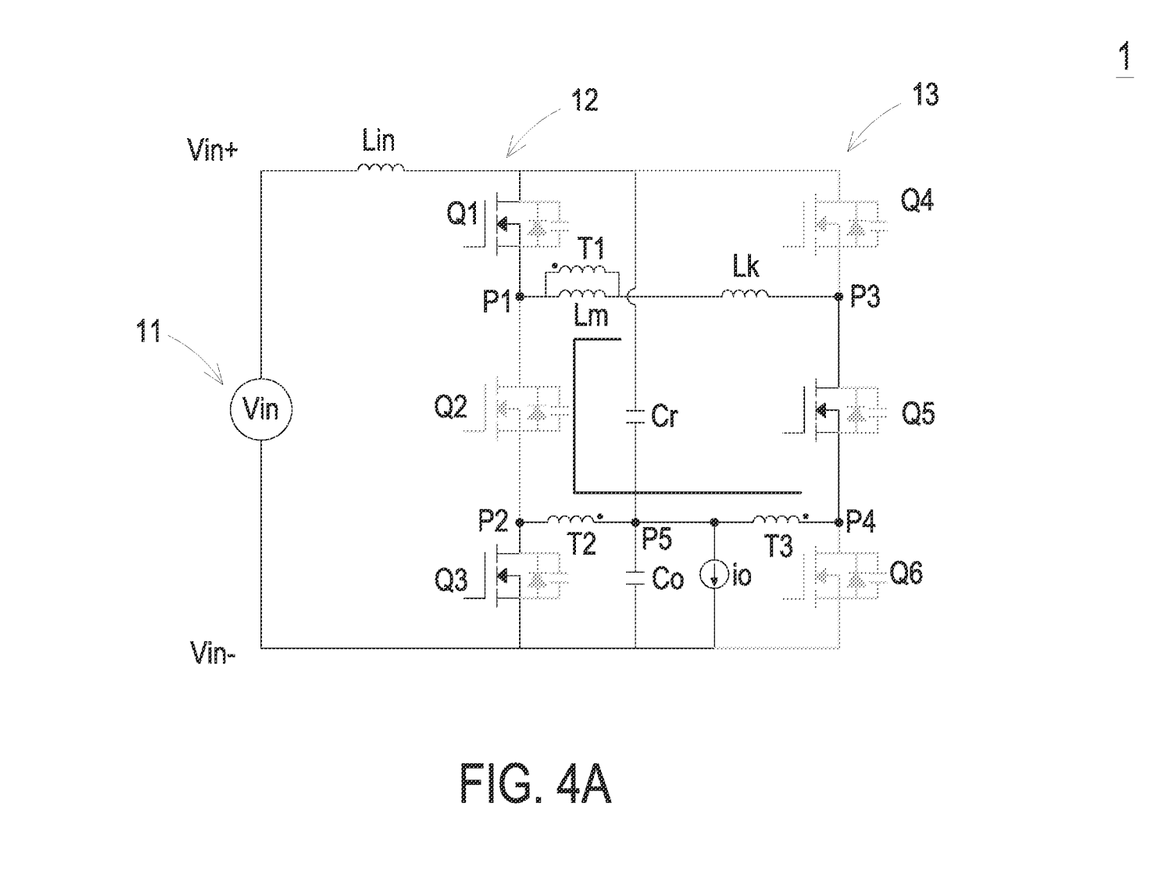
FIG. 4A and FIG. 4B show the working state of the power conversion circuit of FIG. 2A in different time periods shown in FIG. 3.
Figure 4B:
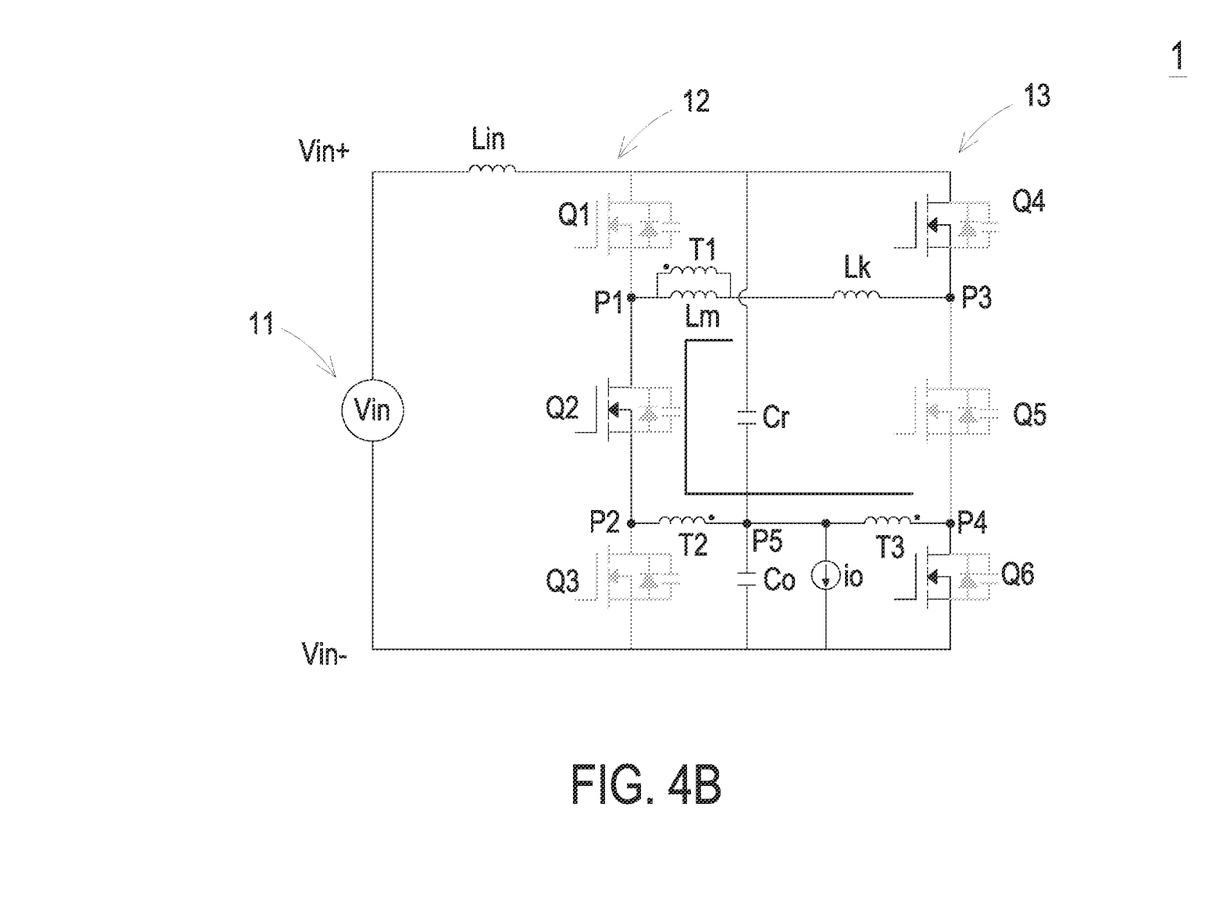

FIG. 3 is a schematic oscillogram illustrating the key waveforms of the power conversion circuit of FIG. 2A. FIG. 4A and FIG. 4B show the working state of the power conversion circuit of FIG. 2A in different time periods shown in FIG. 3. In FIG. 3, Vgs1/3/5 is the gate-source voltage of the first, third and fifth switches Q1, Q3 and Q5; Vgs2/4/6 is the gate-source voltage of the second, fourth and sixth switches Q2, Q4 and Q6; Vds1/5 is the drain-source voltage of the first and fifth switches Q1 and Q5; Vds2/4 is the drain-source voltage of the second and fourth switches Q2 and Q4; iLk is the current flowing through the series inductor Lk; iLm is the magnetizing current flowing through the magnetizing inductance Lm; and iT2 and iT3 are the currents flowing through the second winding T2 and the third winding T3 respectively. Regarding the power conversion circuit shown in FIG. 4A and FIG. 4B, the part where the current flows through is depicted by the lines with dark color, and the part where the current doesn't flow through is depicted by the lines with light color.

As shown in FIG. 3, the time period from time t0 to t4 is a switching cycle. The first, third and fifth switches Q1, Q3 and Q5 are turned on and off synchronously, and the second, fourth and sixth switches Q2, Q4 and Q6 are turned on and off synchronously. The control signals of the first, third and fifth switches Q1, Q3 and Q5 are out of phase by 180 degrees with respect to the control signals of the second, fourth and sixth switches Q2, Q4 and Q6. The duty ratio of all the said switches is about 50%.

Please refer to FIG. 3 and FIG. 4A. During the time period from time t0 to t1, the first, third and fifth switches Q1, Q3 and Q5 are in an on state, the second, fourth and sixth switches Q2, Q4 and Q6 are in an off state, and the corresponding working state of the power conversion circuit 1 is shown in FIG. 4A. The magnetizing current iLm increases linearly, an oscillation is generated between the series inductor Lk and the auxiliary capacitor Cr, and the waveforms of the generated oscillating current iLk and the voltage VCr across the auxiliary capacitor Cr are approximately sine waves. The current iT1 flowing through the first winding T1 equals iLK−iLm (i.e., iT1=iLK−iLm). Through the magnetic coupling between the first winding T1, the second winding T2 and the third winding T3, the current iT2 induced in the second winding T2 equals iT1*(N2/N1+1) (i.e., iT2=iT1*(N2/N1+1). Since the third winding T3 and the second winding T2 have the same number of turns, the current iT3 induced in the third winding T3 is equal to the current iT2. The DC component of the sum of the currents iT2 and iT3 is the output current io. The AC component of the sum of the currents iT2 and iT3 flows through the output capacitor Co and the auxiliary capacitor Cr.

In addition, all the switches are turned on and off with a switching cycle, and an oscillating cycle is determined by the series inductor Lk and the auxiliary capacitor Cr. In this embodiment, the oscillating cycle is substantially equal to a half of the switching cycle, where the oscillating cycle equals $2\pi\sqrt{Lk \cdot Cr}$.

At the time t0, the initial value of the oscillating current iLk is equal to the magnetizing current iLm, and the initial value of the voltage VCr across the auxiliary capacitor Cr is equal to the input voltage Vin. The magnetizing current iLm can be approximated to zero due to the large magnetizing inductance Lm. During the time period from time t0 to t1, the oscillating current iLk completes one oscillating cycle, and the first, third and fifth switches Q1, Q3 and Q5 are turned off when the oscillating current iLk is close to zero, thereby realizing the zero-current turn-off and reducing the turn-off loss. Further, during the time period from time t0 to t1, the voltage VCr across the auxiliary capacitor Cr completes one oscillating cycle, and the voltage VCr returns to equal the input voltage Vin at the time t1.

Please refer to FIG. 3 and FIG. 4B. During the time period from time t2 to t3, the second, fourth and sixth switches Q2, Q4 and Q6 are in the on state, the first, third and fifth switches Q1, Q3 and Q5 are in the off state, and the corresponding working state of the power conversion circuit 1 is shown in FIG. 4B. The working principle of the power conversion circuit 1 during this time period is similar to that during the time period from time t0 to t1, thus the detailed descriptions thereof are omitted herein.

In addition, as shown in FIG. 3, the time period from time t1 to t2 and the time period from time t3 to t4 are dead time. During the dead time, the magnetizing current iLm charges or discharges the parasitic capacitance of the corresponding switch so that the drain-source voltage of the switch which is about to turn on would decrease to zero at the end of the dead time. In particular, in the dead time of the first half cycle (i.e., in the time period from time t1 to t2), the magnetizing current iLm charges the parasitic capacitances of the first, third and fifth switches Q1, Q3 and Q5, and discharges the parasitic capacitances of the second, fourth, and sixth switches Q2, Q4 and Q6. Accordingly, the drain-source voltage Vds2/4/6 of the second, fourth and sixth switch Q2, Q4 and Q6, which are about to turn on, decreases to zero at the time t2. In the dead time of the second half cycle (i.e., in the time period from time t3 to t4), the magnetizing current iLm charges the parasitic capacitances of the second, fourth and sixth switches Q2, Q4 and Q6, and discharges the parasitic capacitances of the first, third and fifth switches Q1, Q3 and Q5. Accordingly, the drain-source voltage Vds1/3/5 of the first, third and fifth switches Q1, Q3 and Q5, which are about to turn on, decreases to zero at the time t4. Consequently, at the end of each dead time, the drain-source voltage of the switch which is about to turn on decreases to zero, thereby realizing the zero-voltage turn-on of the switch and reducing the turn-on loss of the switch. Further, since the dead time is much shorter than the total turn-on time length of the switch (about less than one tenth of the total turn-on time length of the switch), the variation of other variables during the dead time can be ignored. In another embodiment, at the end of each dead time, the drain-source voltage of the switch which is about to turn on decreases to be smaller than a half of that at the beginning of the dead time. Although the zero-voltage turn-on of the switch cannot be realized, the turn-on loss of the switch is still reduced.

According to the circuit structure of the power conversion circuit shown in FIG. 2A and the control strategy shown in FIG. 3, the relation between the input voltage Vin and the output voltage Vo of the power conversion circuit 1 can be obtained as: Vin=Vo*(2+N1/N2). That is, the gain ratio of input to output voltage of the power conversion circuit 1 is (2+N1/N2):1. For example, when the turns ratio of the first, second and third windings T1, T2 and T3 is 2:1:1 (i.e., N1/N2=2), the gain ratio of input to output voltage of the power conversion circuit 1 is 4:1. When the turns ratio of the first, second and third windings T1, T2 and T3 is 3:1:1 (i.e., N1/N2=3), the gain ratio of input to output voltage of the power conversion circuit 1 is 5:1. It can be seen that the power conversion circuit 1 of the present disclosure can vary the gain ratio of input to output voltage through adjusting the turns ratio of the windings of the transformer 14. Consequently, the gain ratio of input to output voltage can be flexibly adjusted according to actual requirements, which makes the applicability of the power conversion circuit 1 of the present disclosure great.

Figure 5:
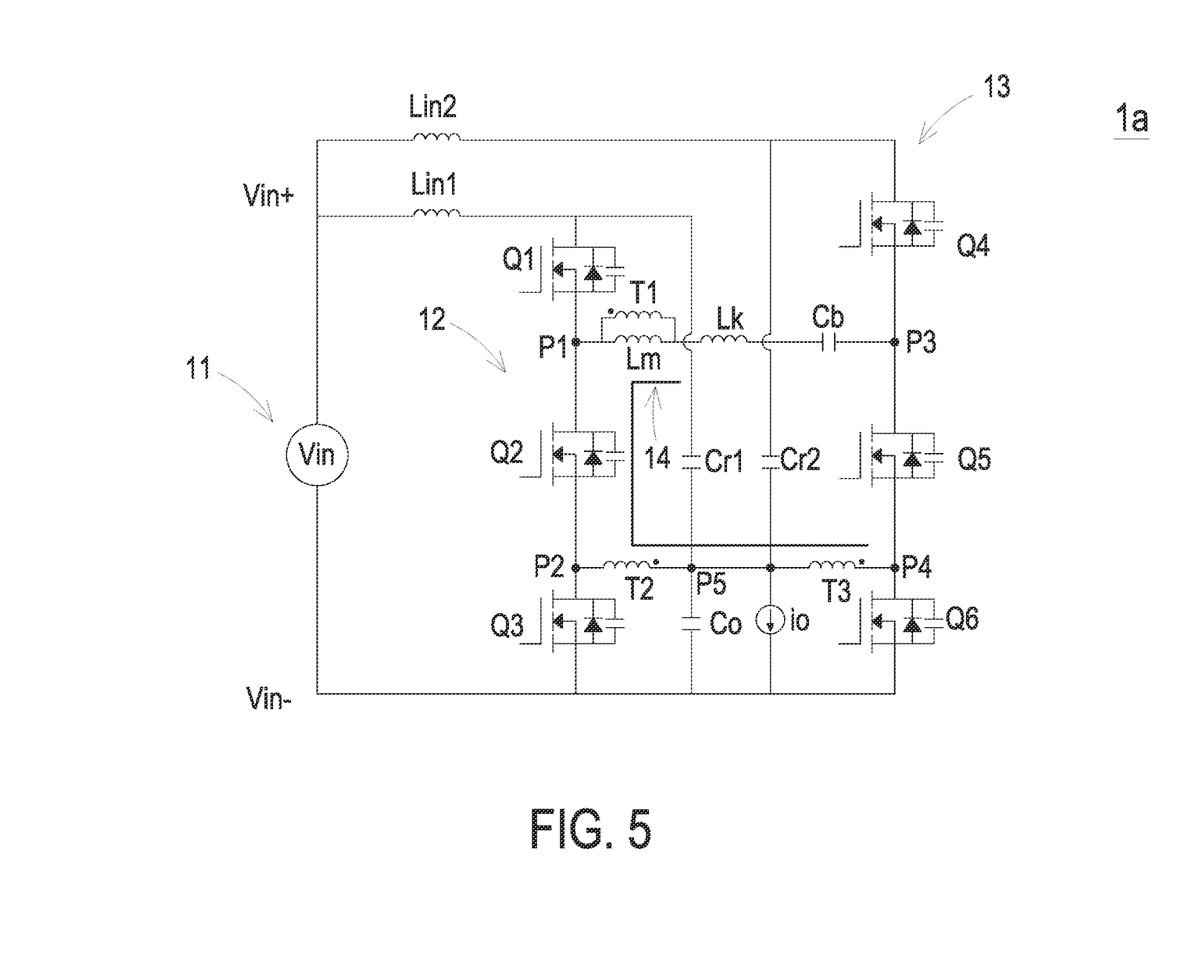
FIG. 5 is a schematic circuit diagram illustrating a power conversion circuit according to another embodiment of the present disclosure.

In an embodiment, as shown in FIG. 5, the input inductor of the power conversion circuit 1a includes a first input inductor Lin1 and a second input inductor Lin2, and the auxiliary capacitor of the power conversion circuit 1a includes a first auxiliary capacitor Cr1 and a second auxiliary capacitor Cr2. The inductances of the first and second input inductors Lin1 and Lin2 are both much larger than the inductance of the series inductor Lk. The first terminals of the first input inductor Lin1 and the second input inductor Lin2 are both electrically connected to the input positive terminal Vin+. The second terminal of the first input inductor Lin1 is electrically connected to the first switch Q1 of the first bridge arm 12 and the first terminal of the first auxiliary capacitor Cr1. The second terminal of the second input inductor Lin2 is electrically connected to the fourth switch Q4 of the second bridge arm 13 and the first terminal of the second auxiliary capacitor Cr2. The second terminals of the first auxiliary capacitor Cr1 and the second auxiliary capacitor Cr2 are both electrically connected to the output positive terminal Vo+. In addition, as shown in FIG. 5, the power conversion circuit 1a further includes a blocking capacitor Cb. The blocking capacitor Cb, the first winding T1 and the series inductor Lk are coupled in series between the first and third connection points P1 and P3, so as to prevent the transformer 14 from being magnetically biased and saturated when the capacitances of the first auxiliary capacitor Cr1 and the second auxiliary capacitor Cr2 being unequal.

Figure 6:
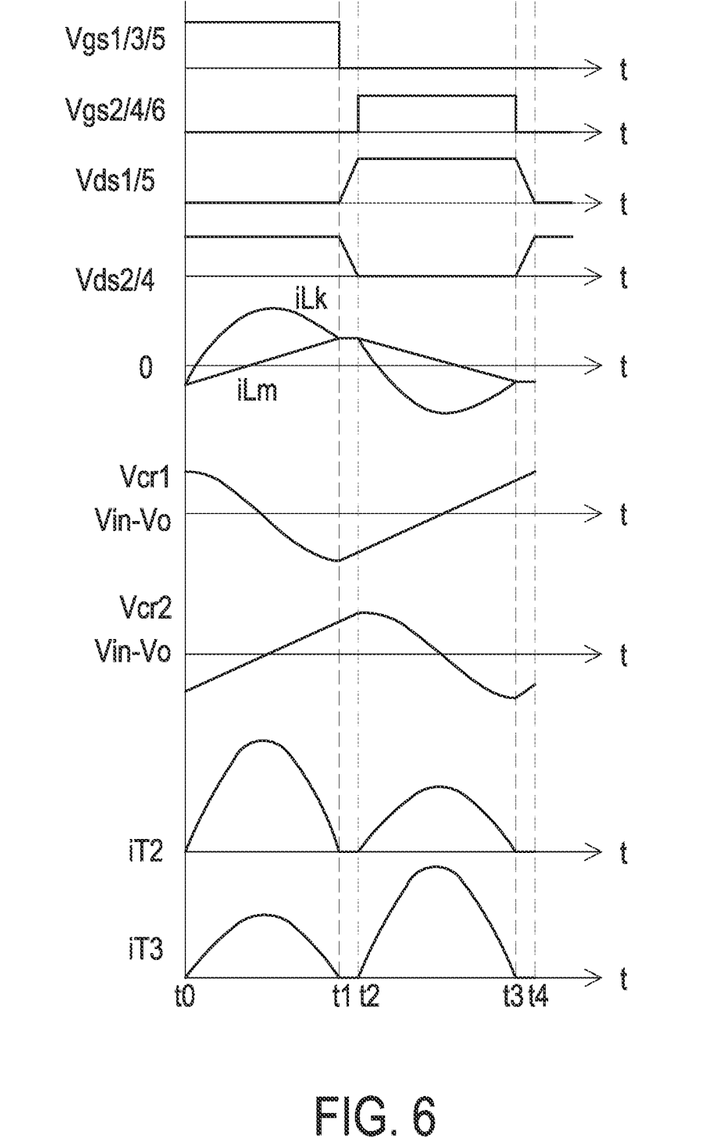
FIG. 6 is a schematic oscillogram illustrating the key waveforms of the power conversion circuit of FIG. 5.
Figure 7A:
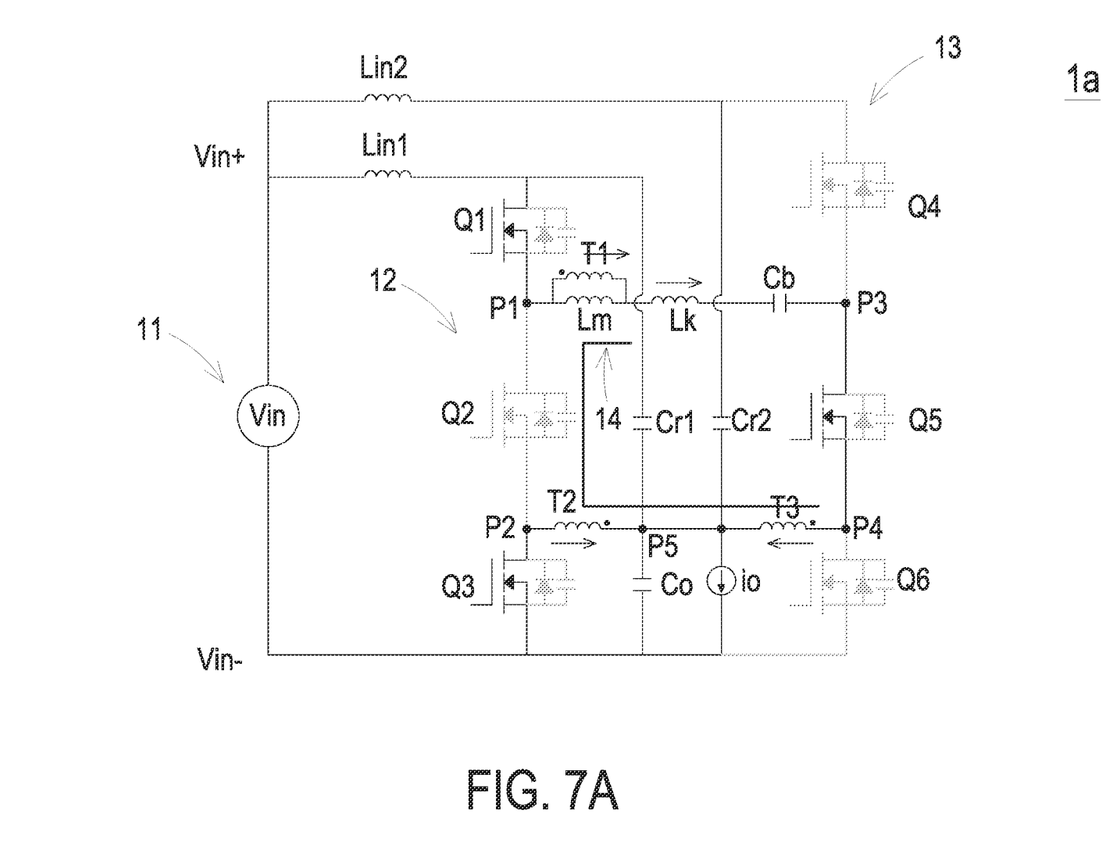
FIG. 7A and FIG. 7B show the working state of the power conversion circuit of FIG. 5 in different time periods shown in FIG. 6.
Figure 7B:
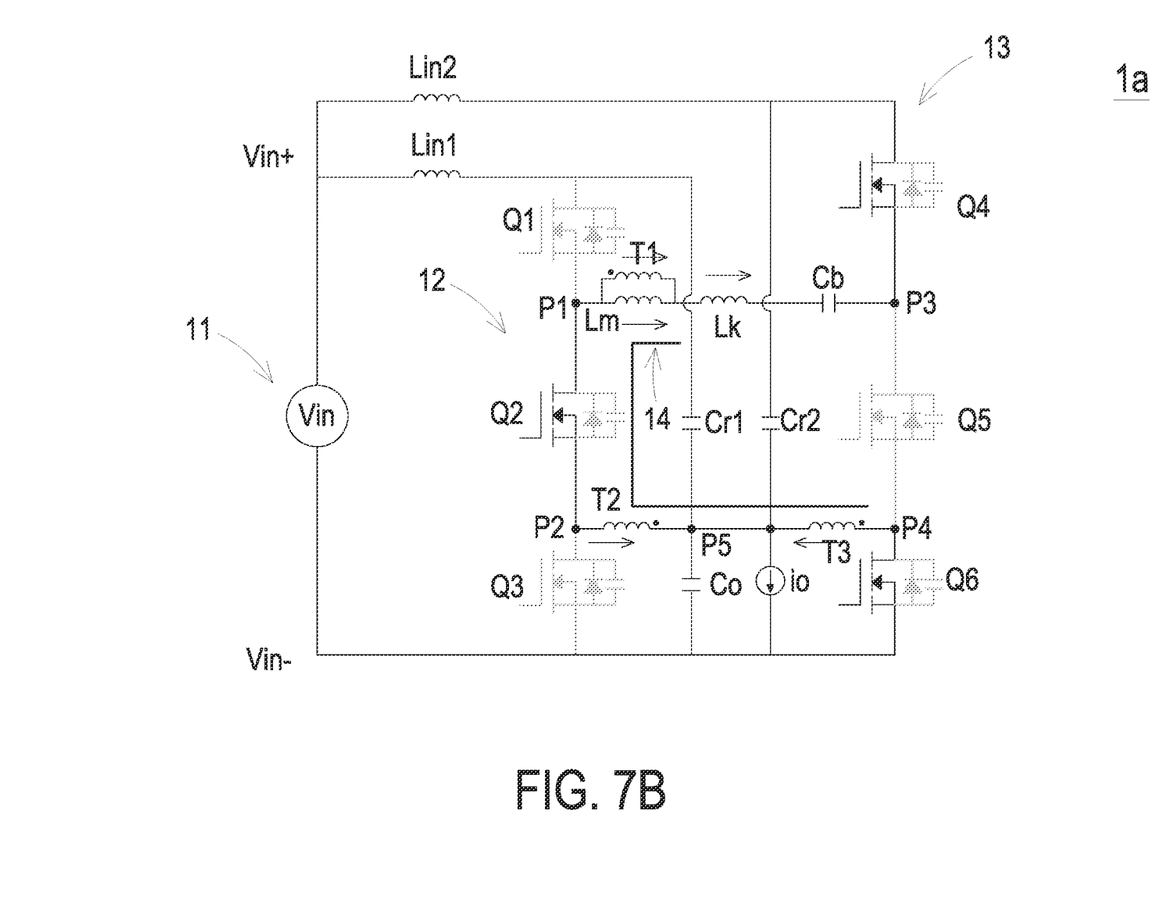

In FIG. 5, the components corresponding to those of FIG. 2A and FIG. 2B are designated by identical numeral references, and detailed descriptions thereof are omitted herein. FIG. 7A and FIG. 7B show the working state of the power conversion circuit of FIG. 5 in different time periods shown in FIG. 6. As shown in FIG. 6, FIG. 7A and FIG. 7B, the operation of the switches are similar to that described above, and the relation between the gain ratio of input to output voltage of the power conversion circuit 1a and the turns ratio of the windings of the transformer 14 is also similar to that described above, thus detailed descriptions thereof are omitted herein.

In the embodiment shown in FIG. 5, the inductances of the two input inductors Lin1 and Lin2 are designed to be equal, and the capacitances of the two auxiliary capacitors Cr1 and Cr2 are designed to be equal, thereby making the switching cycle of the switches equal to the oscillating cycle. However, in actual production, the two inductors and the two capacitors may deviate from the designed inductance and capacitance (e.g., with ±15% deviation) due to the parameter tolerance, and thus the switching cycle of the switch is approximately equal to the oscillating cycle. As shown in FIG. 6, at the time t0, the initial value of the oscillating current iLk is equal to the magnetizing current iLm, the initial value of the voltage VCr1 across the first auxiliary capacitor Cr1 is the maximum of one switching cycle, and the initial value of the voltage VCr2 across the second auxiliary capacitor Cr2 is the minimum of one switching cycle. The magnetizing current iLm can be approximated as zero due to large magnetizing inductance Lm. During the time period from time t0 to t1 or during the time period from time t2 to t3, the oscillating current iLk oscillates for a half of the oscillating cycle. At the time t1 or t3, the oscillating current iLk is close to zero, and the corresponding switch is turned off at this time to achieve zero-current turn-off, thereby reducing the turn-off loss. Moreover, during the time period from time t0 to t1, the voltage VCr1 across the first auxiliary capacitor Cr1 oscillates for a half of the oscillating cycle and reaches its minimum of one switching cycle at time t1, and the voltage VCr2 across the second auxiliary capacitor Cr2 is charged to the maximum of one switching cycle by the second input inductor Lin2 at time t1. During the time period from time t2 to t3, the voltage VCr2 across the second auxiliary capacitor Cr2 oscillates for a half of the oscillating cycle and reaches its minimum of one switching cycle at time t3, and the voltage VCr1 across the first auxiliary capacitor Cr1 is charged to the maximum of one switching cycle by the first input inductor Lin1 at time t3.

In above embodiments, the power conversion circuits 1 and 1a both work in a preferred working state, namely the switching cycle is equal to an ideal value. In specific, the switching cycle is twice the oscillating cycle in the power conversion circuit 1, and the switching cycle is equal to the oscillating cycle in the power conversion circuit 1a. However, even if the power conversion circuits 1 and 1a work in a non-preferred working state, the operation of switches and the work principle of the power conversion circuit 1 and 1a are still the same and have identical technique effect. In the non-preferred working state, the switching cycle is not equal to twice of the oscillating cycle in the power conversion circuit 1 (e.g., the switching cycle is larger than 3/2 of the oscillating cycle and is smaller than 5/2 of the oscillating cycle), or the switching cycle is not equal to the oscillating period in the power conversion circuit 1a (e.g., the switching cycle is larger than ½ of the oscillating cycle and is smaller than 3/2 of the oscillating cycle). Since the switching cycle is not equal to the ideal value, the switch would be turned off earlier or later, resulting in being unable to achieve zero-current turn-off and increasing the turn-off loss. Therefore, the efficiency of the power conversion circuits 1 and 1a decreases.

Figure 8:
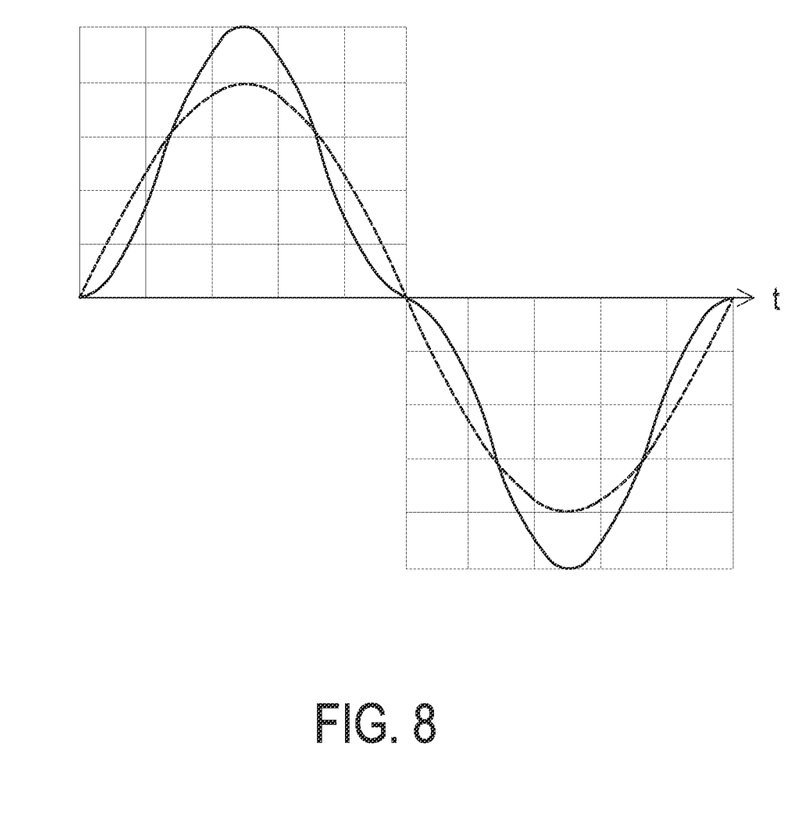
FIG. 8 is a schematic oscillogram showing the oscillating current of the power conversion circuits of FIG. 2A and FIG. 5.

Under the circumstance that the power conversion circuits 1 and 1a both work in the preferred working state, when the input voltage Vin, the output voltage Vo, the output current io and other parameters of the power conversion circuits 1 and 1a are identical and the magnetizing current iLm is ignored, the oscillating currents of the power conversion circuits 1 and 1a are shown in FIG. 8. In FIG. 8, the oscillating current of the power conversion circuit 1 is depicted by a solid line, and the oscillating current of the power conversion circuit 1a is depicted by a dashed line. As shown in FIG. 8, the power conversion circuits 1 and 1a can realize the zero-current turn-off of a switch. While in the power conversion circuit 1, the peak value of the oscillating current is larger, and the corresponding current effective value is also larger. Therefore, the parasitic resistance loss on the current path in the power conversion circuit 1 is larger than that in the power conversion circuit 1a, where the parasitic resistance may include the on resistance of the switch, the parasitic resistance on the line, the parasitic resistance of the capacitor or inductor and so on.

Figure 9:
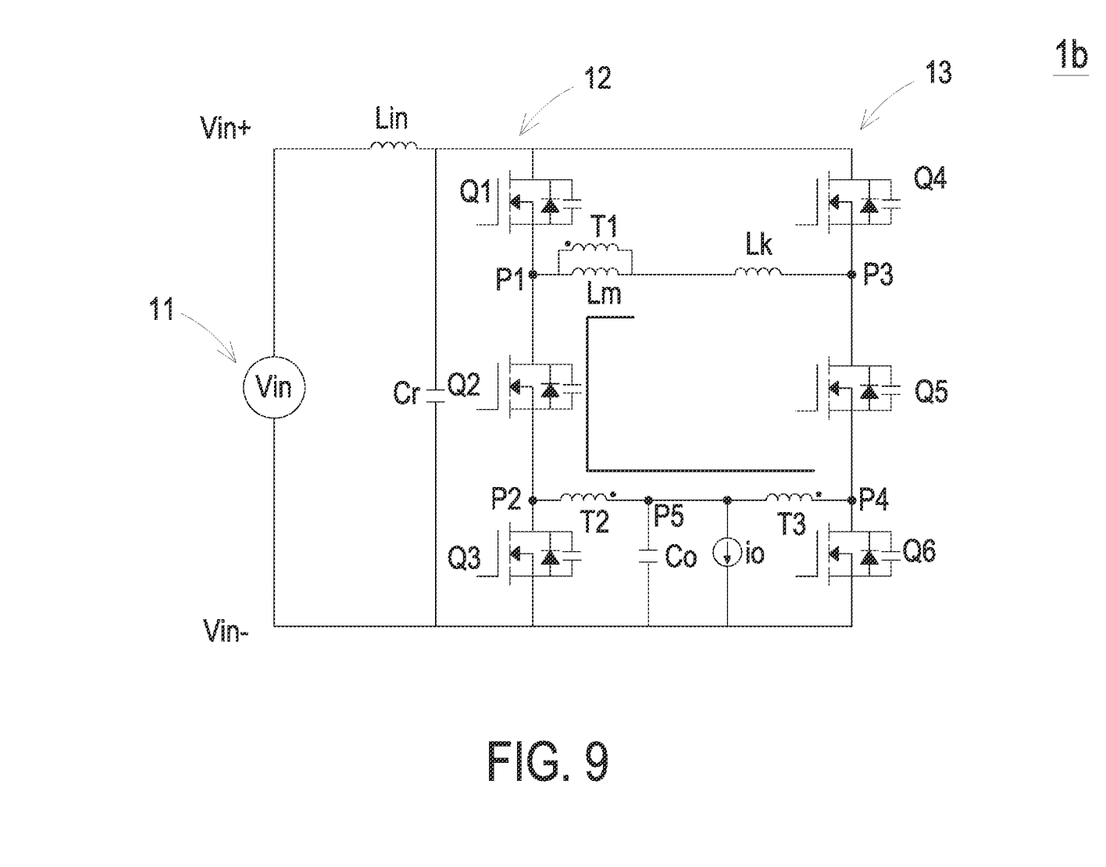
FIG. 9 is a schematic circuit diagram illustrating a variant of the power conversion circuit of FIG. 2A.
Figure 10:
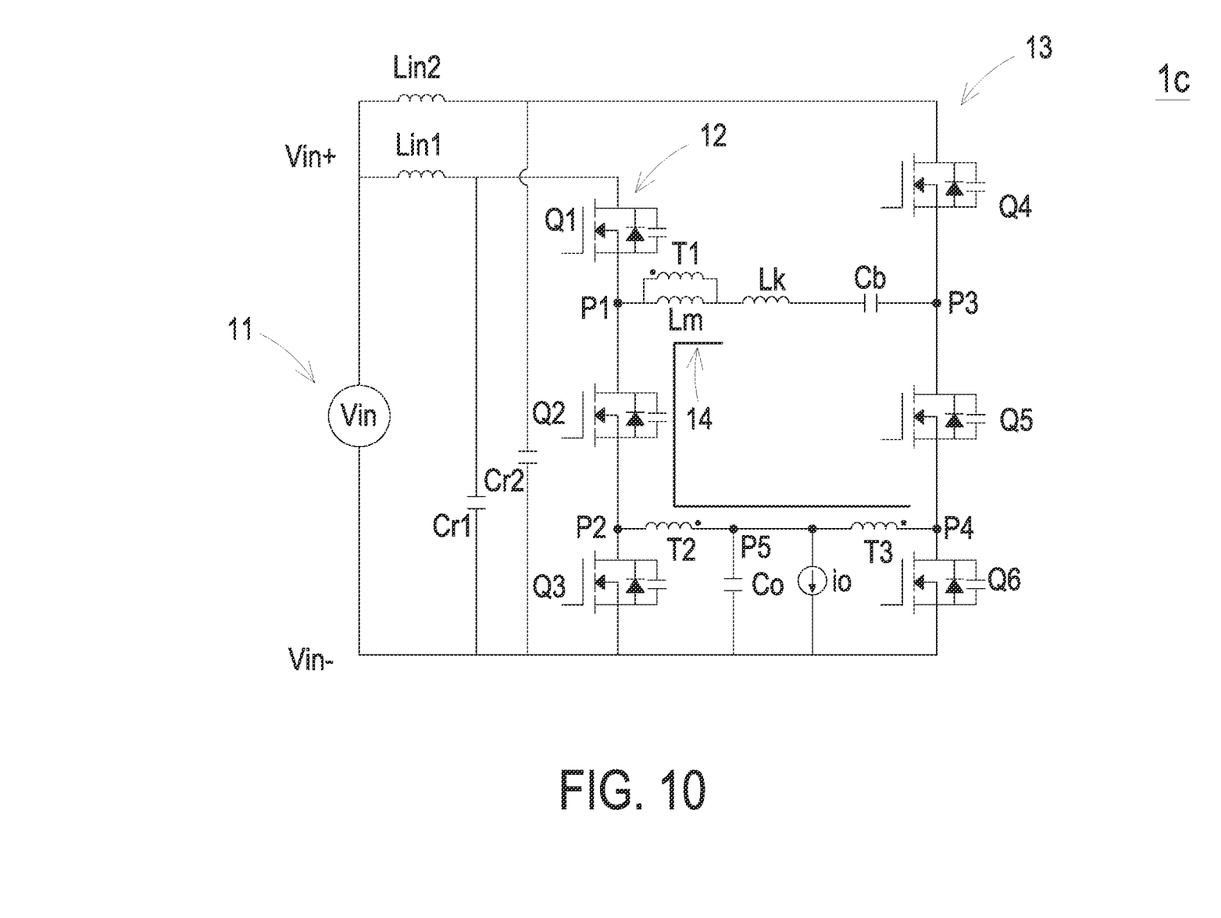
FIG. 10 is a schematic circuit diagram illustrating a variant of the power conversion circuit of FIG. 5.

In addition, the auxiliary capacitor is not limited to be disposed at the position shown in the above embodiments. In the embodiment shown in FIG. 2A, the first terminal of the auxiliary capacitor Cr is electrically connected to the second terminal of the input inductor Lin, and the second terminal of the auxiliary capacitor Cr is electrically connected to the output positive terminal Vo+, but not limited thereto. In another embodiment, as shown in FIG. 9, the second terminal of the auxiliary capacitor Cr is changed to be electrically connected to the output negative terminal Vo−. Similarly, in the embodiment shown in FIG. 5, the first terminals of the first and second auxiliary capacitors Cr1 and Cr2 are electrically connected to the second terminals of the first and second input inductors Lin1 and Lin2 respectively, and the second terminals of the two auxiliary capacitors Cr1 and Cr2 are both electrically connected to the output positive terminal Vo+, but not limited thereto. In another embodiment, as shown in FIG. 10, the second terminals of the first and second auxiliary capacitors Cr1 and Cr2 are changed to be electrically connected to the output negative terminal Vo−.

In summary, the present disclosure provides a power conversion circuit with a variable gain ratio of input to output voltage. The gain ratio of input to output voltage may be varied through adjusting the turns ratio of the windings of the transformer. Accordingly, the power conversion circuit can be applied in applications with various requirements for gain ratio of input to output voltage, namely the applicability of the power conversion circuit is great.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion circuit, comprising:
an input positive terminal, an input negative terminal, an output positive terminal and an output negative terminal, wherein the input negative terminal and the output negative terminal are connected to each other;
an input inductor, wherein a first terminal of the input inductor is coupled to the input positive terminal;
a first bridge arm comprising a first switch, a second switch and a third switch coupled in series, wherein the first and third switches are electrically connected to a second terminal of the input inductor and the input negative terminal respectively, the first and second switches are connected and form a first connection point, and the second and third switches are connected and form a second connection point;
a second bridge arm comprising a fourth switch, a fifth switch and a sixth switch coupled in series, wherein the fourth and sixth switches are electrically connected to the second terminal of the input inductor and the input negative terminal respectively, the fourth and fifth switches are connected and form a third connection point, and the fifth and sixth switches are connected and form a fourth connection point;
a transformer comprising a first winding, a second winding and a third winding, wherein the first winding is coupled between the first and third connection points, the second and third windings are coupled between the second and fourth connection points, the second and third windings are connected and form a fifth connection point, and the fifth connection point is connected to the output positive terminal;
an output capacitor connected between the output positive terminal and the output negative terminal; and
an auxiliary capacitor, wherein a first terminal of the auxiliary capacitor is electrically connected to the second terminal of the input inductor, and a second terminal of the auxiliary capacitor is electrically connected to the output positive terminal or the output negative terminal, wherein a first terminal of the first winding is electrically connected to the second connection point through the second switch, and a second terminal of the first winding is electrically connected to the fourth connection point through the fifth switch.

2. The power conversion circuit according to claim 1, wherein the first, third and fifth switches are turned on and off synchronously, the second, fourth and sixth switches are turned on and off synchronously, and control signals of the first, third and fifth switches are out of phase by 180 degrees with respect to control signals of the second, fourth and sixth switches.

3. The power conversion circuit according to claim 2, wherein a duty ratio of all the said switches is substantially 50%.

4. The power conversion circuit according to claim 1, wherein a voltage between the input positive terminal and the input negative terminal is an input voltage, a voltage between the output positive terminal and the output negative terminal is an output voltage, and a relation between the input voltage and the output voltage is Vo=Vin*[N2/(N1+N2*2)], where Vo is the output voltage, Vin is the input voltage, N1 is a number of turns of the first winding, N2 is a number of turns of the second winding, and the number of turns of the second and third windings are the same.

5. The power conversion circuit according to claim 1, further comprising a series inductor, wherein the series inductor comprises a leakage inductance of the transformer and/or an additional inductor, and the first winding and the series inductor are coupled in series between the first and third connection points.

6. The power conversion circuit according to claim 5, further comprising a blocking capacitor, wherein the blocking capacitor, the first winding and the series inductor are coupled in series between the first and third connection points.

7. The power conversion circuit according to claim 5, wherein all the said switches are turned on and off with a switching cycle, the series inductor and the auxiliary capacitor determines an oscillating cycle, and the switching cycle is larger than 3/2 of the oscillating cycle and is smaller than 5/2 of the oscillating cycle.

8. The power conversion circuit according to claim 7, wherein the switching cycle is substantially equal to twice of the oscillating cycle.

9. The power conversion circuit according to claim 7, wherein the switching cycle comprises a dead time, during the dead time, a parasitic capacitance of the corresponding switch is charged or discharged by a magnetizing current for achieving zero-voltage turn-on.

10. The power conversion circuit according to claim 7, wherein the switching cycle comprises a dead time, at the end of the dead time, a drain-source voltage of the switch which is about to turn on decreases to be smaller than a half of the drain-source voltage at the beginning of the dead time.

11. The power conversion circuit according to claim 5, wherein the input inductor comprises a first input inductor and a second input inductor, the auxiliary capacitor comprises a first auxiliary capacitor and a second auxiliary capacitor, first terminals of the first and second input inductors are both electrically connected to the input positive terminal, a second terminal of the first input inductor is electrically connected to the first switch and a first terminal of the first auxiliary capacitor, a second terminal of the second input inductor is electrically connected to the fourth switch and a first terminal of the second auxiliary capacitor, and second terminals of the first and second auxiliary capacitors are both electrically connected to the output positive terminal or the output negative terminal.

12. The power conversion circuit according to claim 11, wherein inductances of the first and second input inductors are equal, capacitances of the first and second auxiliary capacitors are equal, all the said switches are turned on and off with a switching cycle, the series inductor and the auxiliary capacitors oscillate with an oscillating cycle, and the switching cycle is larger than ½ of the oscillating cycle and is smaller than 3/2 of the oscillating cycle.

13. The power conversion circuit according to claim 12, wherein the switching cycle is substantially equal to the oscillating cycle.

14. The power conversion circuit according to claim 5, wherein at a time when any of the said switches being turned off, an oscillating current flowing through the series inductor oscillates to be substantially zero.

15. The power conversion circuit according to claim 5, wherein an inductance of the input inductor is larger than an inductance of the series inductor.

16. The power conversion circuit according to claim 1, wherein a voltage between the input positive terminal and the input negative terminal is an input voltage, a voltage between the output positive terminal and the output negative terminal is an output voltage, a voltage on the auxiliary capacitor equal a sum of a DC voltage component and an AC voltage component, and the DC voltage component equals a difference between the input voltage and the output voltage.

17. The power conversion circuit according to claim 1, wherein a capacitance of the output capacitor is larger than a capacitance of the auxiliary capacitor.

* * * * *